Patented Nov. 14, 1944

2,362,888

UNITED STATES PATENT OFFICE 2,362,888

METHOD FOR THE PRODUCTION OF A RESINOUS MATERIAL

Richard F. B. Cox, Wilmington, Del., assignor to Hercules Powder Company, Wilmington, Del., a corporation of Delaware No Drawing. Application May 9, 1942, Serial No. 442,365

2 Claims. (Cl. 260—97)

This invention relates to the preparation of a resinous material; more particularly, this invention relates to a resinous material derived from the reaction of a rosin ester with a metal and method of preparation.

Now in accordance with this invention, there has been found a method of preparing a resinous material which comprises heating at reaction temperature a rosin ester with a metal selected from the group consisting of alkali metal and alkaline earth metals.

As a result of the reaction of a rosin ester with a metal selected from the group consisting of alkali metals and alkaline earth metals when heated to reaction temperatures, a resinous material is isolated from said mixture which is light in color and has a drop melting point of about 80° and appears to be a mixture of acyloin and diacyl of the particular rosin acid used.

The following examples will illustrate this invention. It is understood, however, that such examples are presented merely in illustration of the invention and are not to be construed as limiting the same.

Example 1

To 46 parts by weight of powdered sodium in 1500 parts by weight of dry purified xylene at about 125° C. were added 310 parts by weight of hydrogenated methyl abietate with agitation in a nitrogen atmosphere. Good stirring was continued for 2 hours during which time the mixture became thick and the sodium went into solution. After cooling the resulting mixture, methyl alcohol was added to decompose the unreacted sodium. The resulting product was then washed with water and 125 parts by weight of glacial acetic acid to decompose the alkali. The xylene solution was washed until neutral and then the xylene was removed under reduced pressure. The product was a resin having a color of 13 Amber when tested on a Lovibond color scale, and a drop melting point of 77–78° C. The hydroxyl value was 3.2% OH by Zerewitinoff method and 1.8 by acetylation and methoxyl value 0.28%. The carbonyl value was 2.5%.

Example 2

Example 1 was repeated substituting methyl abietate for the hydrogenated methyl abietate. The reaction was more vigorous than that of Example 1. The alkali was washed out with water without acidifying, and the product was isolated by distilling off the xylene under reduced pressure. The product was a soft resinous material having a color of about 30 Amber when tested on a Lovibond color scale. The methoxyl value was 0.7%, methoxyl 4.5 by the Zerewitinoff method and 1.8 by acetylation, and carbonyl value was 1.6%.

Example 3

To 1500 parts by weight of boiling xylene containing 60 parts by weight of magnesium powder were added 310 parts by weight of hydrogenated methyl abietate. The magnesium gradually dissolved and the solution became viscous. The dissolved magnesium was removed by adding 1200 parts by weight of 20% hydrochloric acid slowly. After washing with water, the xylene was removed in vacuo. The product was about 15 Amber when tested on the Lovibond color scale, melting point 75–76° C., and methoxyl value 1.2%.

Example 4

To 135 parts by weight of sodium powdered in 3000 parts by weight of dry purified xylene at about 130° C. were added 940 parts by weight glycerol abietate in 2000 parts by weight xylene with agitation in a nitrogen atmosphere. Good stirring was continued for 2 hours at 120–135° C., during which time the mixture became thick and the sodium went into solution. After cooling, methanol was added to decompose any unreacted sodium. Then the mixture was washed with water and finally with dilute acid. The xylene layer was then distilled to remove xylene, the last being removed under reduced pressure. The residue was a neutral resin resembling the original ester gum in color and melting point, but with a saponification number of 2–15 instead of 174, the saponification number of the original ester gum.

As will be apparent from the above examples, although methyl abietate, hydrogenated methyl abietate and glycerol abietate were used as the rosin esters, they were used for purposes of illustration and not by way of limitation.

The process of this invention is applicable to any of the various types of rosin esters or mixtures thereof. Thus, the esters of wood rosin, gum rosin or heat treated or polymerized rosin with mono- or polyhydric alcohols may be used in the process of the invention. For example, rosin esters of monohydric alcohols such as methyl, ethyl, amyl, stearyl, abietyl, hydrogenated abietyl alcohols, ethylene glycol monoethyl ether, and of polyhydric alcohols, such as ethylene glycol, diethylene glycol, triethylene glycol, trimethylene glycol, glycerol, diglycerol, pentaerythritol, mannitol, etc., are suitable.

Although sodium and magnesium have been used in the examples as the metals, other alkaline earth metals such as calcium, barium, strontium, etc., as well as other alkali metals, such as, lithium, potassium, etc., may be used.

In the process of carrying out this invention, a rosin ester, such as commercial methyl abietate, and an alkali metal or alkaline earth metal, preferably sodium, are heated to reaction temperature. The metal may be reacted directly with the rosin ester or may be suspended in an inert solvent in finely divided form. If a solvent is used, a high boiling solvent is preferable. Among solvents which may be used are, for example, monocyclic aromatic hydrocarbons, such as toluene, xylene, etc.; petroleum hydrocarbons, such as high boiling gasoline, V. M. & P. naphtha, hexane, heptane, etc.; solvents, such as cyclohexane, methyl cyclohexane, tetrahydro and decahydronaphthalenes, etc. The mixture is agitated for a period of from about ½ hour to 8 hours, although in practice, an agitation period of from about 1 hour to 2 hours has been found preferable. At the end of the reaction, the mixture thickens and more rapid agitation is required. The excess metal is removed by the addition of water or alcohol, and the alkali may or may not, if desired, be neutralized by the addition of dilute acid. Any excess metal may be removed by washing with water. If the metal has been suspended in an inert solvent, the product may be isolated by distilling off the solvent under reduced pressure or any other suitable means.

Heating is necessary to carry out this reaction of the rosin ester with the metal to completion. The preferred range of temperature is from about 80° to about 200° C., although these temperatures may be varied. The amount of metal may differ since the minimum amount is that required to give a diacyl. Any unreacted metal may be filtered out in the case of less reactive metals and can be reused. In practice it has been found that from one to two moles of monovalent metal per mole of rosin ester has proven satisfactory. If a divalent metal is used, only one-half the amount required for a monovalent metal need be used.

The resinous product prepared by this invention is light in color, as for example, a product 13 Amber in color has been obtained without further refining. It has a drop melting point of about 80°. It appears to be a mixture of the acyloin and diacyl of the particular rosin acid used. It has good plasticizing qualities. It is unsaponifiable and alkali resistant. In addition, it is useful in rubber compounding and as an intermediate in preparing esters which are also useful as plasticizers and resin components. It has an alcoholic hydroxyl value of about 1% to 3%, and a methoxyl value of from about 0% to 2%. It is compatible with ethyl cellulose, but not with cellulose acetate or nitrate when equal weights are used.

What I claim and desire to protect by Letters Patent is:

1. The method of producing a resinous material which comprises heating a reaction mixture consisting of a rosin ester, an alkaline earth metal, and an inert solvent at a temperature of between about 80° C. and about 200° C. for a period of from about 0.5 hour to about 8 hours.

2. The method of producing a resinous material which comprises heating a reaction mixture consisting of a rosin ester, magnesium, and an inert solvent at a temperature of between about 80° C. and about 200° C. for a period of from about 0.5 hour to about 8 hours.

RICHARD F. B. COX.